May 7, 1968 L. L. MANKOFF ET AL 3,382,412
ELECTRIC CIRCUIT BREAKER COMPRISING CERAMIC CAPACITOR
ELEMENTS CONNECTED IN PARALLEL WITH ITS CONTACTS
Original Filed Nov. 13, 1963
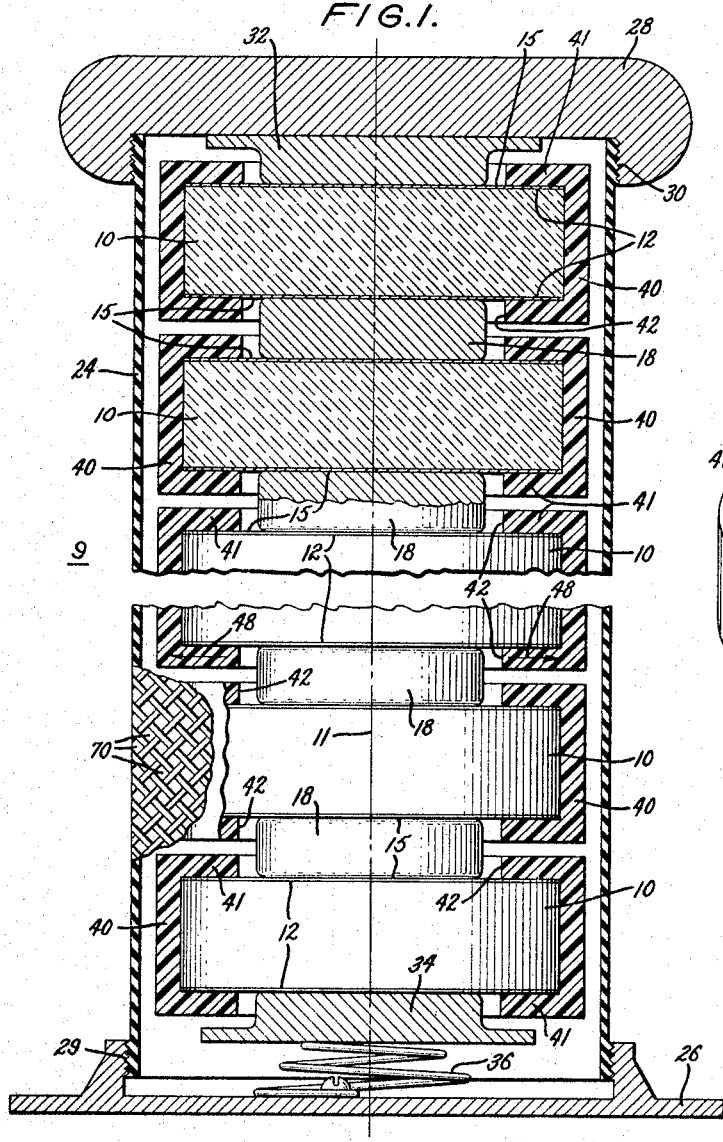
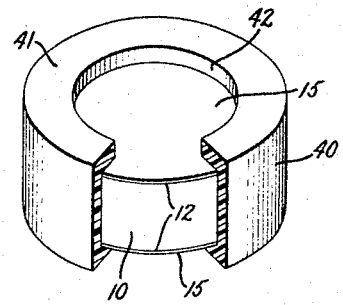
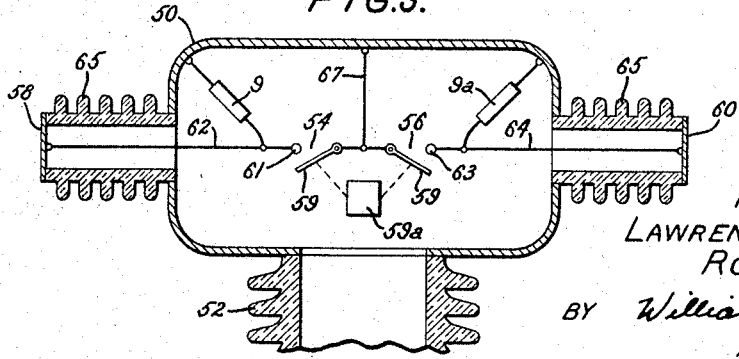
INVENTORS:
LAWRENCE L. MANKOFF,
ROY NAKATA,
BY William Freedman
ATTORNEY United States Patent Office
3,382,412
Patented May 7, 1968

3,382,412
ELECTRIC CIRCUIT BREAKER COMPRISING CERAMIC CAPACITOR ELEMENTS CONNECTED IN PARALLEL WITH ITS CONTACTS
Lawrence L. Mankoff, Broomall, and Roy Nakata, Bryn Mawr, Pa., assignors to General Electric Company, a corporation of New York
Original application Nov. 13, 1963, Ser. No. 323,414, now Patent No. 3,325,708, dated June 13, 1967. Divided and this application May 22, 1967, Ser. No. 640,033
3 Claims. (Cl. 317—58)

ABSTRACT OF THE DISCLOSURE

An electric circuit breaker comprising separable contacts and a capacitor assembly comprising series-connected ceramic capacitor elements connected in parallel with the contacts. The capacitor assembly comprises conductive buttons between the ceramic elements that have sufficient resistance to overdamp the circuit comprising said capacitor assembly and said contacts when said contacts are closed while said circuit breaker is energized.

---

This application is a division of application S.N. 323,-414, filed Nov. 13, 1963, now Patent No. 3,325,708.

This invention relates to an electric circuit breaker that comprises a pair of separable contacts and a capacitor assembly comprising series-connected ceramic capacitor elements connected in parallel with the contacts.

When the contacts of an energized circuit breaker of this type are driven from open to closed position, a short circuit path is established through the contacts across the terminals of the capacitor assembly, and the capacitor is free to quickly discharge through this path. It has been found that this sudden discharge subjects the ceramic capacitor elements to high mechanical stresses which sometimes even crack the ceramic. The mechanical stresses are believed to be due to an electrostrictive effect, the severity of which varies directly with the peak voltage appearing across the capacitor following initial capacitor discharge.

An object of our invention is to prevent damage to the capacitor elements from electrostrictive effects resulting from rapid discharge of the capacitor assembly.

For a better understanding of our invention, reference may be had to the following description taken in conjunction with the accompanying drawing, wherein:

FIG. 1 is a side elevational view, mostly in section, showing a capacitor assembly embodying one form of our invention.

FIG. 2 is a perspective view, partly in section, showing a component of the assembly of FIG. 1.

FIG. 3 is a schematic view of an electric circuit breaker containing the capacitor assembly of FIG. 1.

Referring now to FIG. 1, the capacitor assembly is designated 9 and comprises a plurality of ceramic capacitor elements 10 stacked in end-to-end relationship along the centrally-located longitudinal axis 11 of the capacitor assembly. In the illustrated embodiment, each capacitor element 10 is a cylindrical disk having a pair of opposed planar faces 12 extending transversely of the longitudinal axis 11 and a periphery 14 extending between the planar faces 12 generally parallel to the longitudinal axis 11. A perspective view of one of the ceramic elements 10 is shown in FIG. 2. Each of the ceramic elements is made of a ceramic material having a high dielectric strength and a high dielectric constant, such as, for example, barium titanate. The opposed faces 12 of each ceramic element are covered by a thin coating 15 of conductive material bonded thereto. Preferably, this coating is a silver dispersion fused integrally onto the ceramic face 12. This silver coating covers the whole face 12 of the ceramic element so that its outer periphery is located at the outer periphery of the ceramic element.

For connecting the ceramic capacitor units in series circuit relationship, a plurality of conductive buttons 18, preferably of steel cadmium plated to resist corrosion, are provided. One of these conductive buttons 18 is located between each adjacent pair of ceramic capacitor units 10. Each of these conductive buttons is preferably of a cylindrical form and has a pair of opposed planar surfaces which contact the silver coatings 15 of the ceramic units 10 to provide a good electrical connection between the button and the silver coatings. It is important to note that these buttons 18 simply bear against adjacent silver coatings and are not attached to them.

For maintaining the ceramic elements 10 and the buttons 18 in superposed relationship as shown in FIG. 1, a tube 24 of insulating material is provided about these elements. At opposite ends of the insulating tube 24, metallic terminal structure 26 and 28 for the capacitor assembly are provided. These terminal structures 26 and 28 are respectively connected to the insulating tube 24 by suitable means such as threaded joints 29 and 30. These terminal structures 26 and 28 are connected in a high voltage power circuit by suitable means (not shown). At the top of the capacitor assembly, a conductive button 32 brazed to the top terminal structure 28 bears against the silver coating 15 on the top of the top ceramic element 10. At the bottom of the capacitor assembly, a conductive button 34 bears against the silver coating on the bottom of the bottom capacitor element 10. A flexible conductive connection in the form of a compression spring 36 is provided between the lower terminal structure 26 and the button 34 to carry current between these parts. This spring 36 bears at one end on the terminal structure 26 and at its other end on the button 34. Contact between the buttons and their adjacent capacitor elements is maintained by the compression spring 36. This compression spring 36 provides an upward force which urges each element of the assembly upwardly into firm engagement with its adjacent element. It will therefore be apparent that the capacitor elements 10 are electrically connected together in series circuit relationship between the terminal structures 26 and 28.

The ceramic elements 10 are of a substantially larger diameter than the conductive buttons 18. As a result the silver coating 15 on each ceramic element projects radially outward considerably beyond the outer periphery of its adjacent button 18 and has an outer peripheral portion extending around the outer periphery of the button. When a high voltage is applied between these silver coatings on opposite faces of the ceramic element, high electrical stress concentrations tend to occur at the outer periphery of the silver coatings. If these high electrical stress concentrations occurred in air, they could ionize the air, and this could lead to a damaging flashover along the periphery of the ceramic element between the silver coatings. We preclude such ionization and resultant flashover by covering the periphery of the silver coatings 15 and the periphery of the ceramic element 10 with a continuous coating 40 of high dielectric strength insulating material. This insulating coating 40, which is preferably made of an epoxy resin, is bonded to the ceramic element and the silver coatings along the entire interface between the insulating coating 40 and the ceramic element 10 and silver coatings 15. This bond prevents any air from being trapped in this interface region. Thus, the high electrical stresses that occur at the periphery of the silver coating are located in the solid insulating material of coating 40, which is able to withstand the stresses without breakdown. In a preferred form of our invention, a thin layer of varnish is disposed between the epoxy coating and the adjacent parts to provide for an improved bond between the epoxy coating and these adjacent parts.

The insulating coating 40 of each ceramic element serves the additional function of positioning the conductive button 18 and limiting the extent to which the button can shift transversely of the assembly. In this respect, note that the insulating coating 40 does not cover the central region of the ceramic element 10 where the button is located. The radially-inwardly projecting flanges 41 that constitute a part of the insulating coating 40 terminate short of the button 18. The inner periphery of the flanges 41 of the insulating coating 40 thus forms an annular shoulder 42 having a diameter slightly greater than that of the button 18. This shoulder 42 is capable of limiting lateral shifting of the button 18, thus helping to assure that the capacitor elements are maintained in their desired assembled relationship. It is noted that the insulating coating 40 is unattached to the button 18.

Since there is no bond between each of our conductive buttons 18 and its adjacent silver-coated ceramic element, it will be apparent that each of these parts can expand and contract freely in response to temperature variations without interference from the adjacent part and without impairing the electrical connections between these parts. Unequal expansion or contraction simply results in a slight sliding of one metallic surface over the other in a direction laterally of the assembly 9. But despite this slight sliding, the parts are maintained in good electrical connection by the spring 36.

Since there is no bond between the insulating coating 40 and the button 18 that it surrounds, the flanges 41 of the insulating coating are free to contract and expand along the face 12 of the ceramic element without imposing any lateral or other forces on the button 18. This feature, together with the absence of attachment between the button 18 and its ceramic element 10, enables the insulating material 40 to expand and contract along the face 12 without detrimentally affecting the portion of the silver coating 15 that the button 18 bears against and without detrimentally affecting the bond between this portion of silver coating 15 and the ceramic body 10.

It has been found that if the button 18 is soldered to the silver coating 15 and the insulating coating 40 is bonded to the button, the soldered joint and the adjacent ceramic can be damaged when the insulation 40 contracts in response to a temperature drop. Such contraction tends to create forces which act radially-outward on the flanges 41 of the insualting coating, as indicated by arrows 48. If the button 18 were bonded to the insulation 40 about the button periphery, these radially-outward forces would severely stress any joint present between the button 18 and the ceramic element 10. This effect is magnified if there is an uneven bond between the insulation 40 and the button about the button periphery.

When the insulation 40 contracts as indicated by the arrows 48, it does impose shear stresses on the joint between the silver coating and the ceramic, but these stresses are not high and can be readily withstood by this joint. These stresses can be reduced even further by reducing the extent to which insulating flanges 41 extend radially inward from the outer periphery of the silver coating 15. In a preferred form of our invention, each of these flanges 41 extends radially-inward along only a minor portion of the radius of the silver coating 15, this radius being measured from the central axis 11 to the outer periphery of the silver coating.

Our assembly is highly compact because the metallic buttons 18 can be relatively thin, as considered along the longitudinal axis 11 of the assembly. This thinness does not interfere with the main function of the buttons, i.e., to electrically interconnect the adjacent capacitor elements. All that is needed in the way of thickness for the buttons is sufficient thickness to assure that the insulating coatings 40 on adjacent ceramic elements will not engage under the pressure of spring 36. Such engagement between the insulating coatings 40 could interfere with good engagement being obtained between the buttons 18 and the conductive coatings 15 on the ceramic elements.

A typical application in which capacitor assembly of our invention is utilized is an air blast circuit breaker, such as the circuit breaker disclosed and claimed in U.S. Patent 2,783,338—Beatty, assigned to the assignee of the present invention. Such a circuit breaker is schematically depicted in FIG. 3. This circuit breaker of FIG. 3 comprises a metallic tank 50 filled with pressurized air at a relatively high pressure, for example, 500 p.s.i. The tank 50 is at a high voltage and is isolated from ground by a suitable insulator 52 on which it is supported. Disposed within the tank 50 are two pairs of separable contacts 54 and 56 connected together in series circuit relationship between the terminals 58 and 60 of the circuit breaker. Each of these pairs of contacts comprises a movable contact 59 which is controlled by an operating mechanism 59a. The operating mechanism 59a operates the two movable contacts in unison, simultaneously closing the contacts and simultaneously opening them. A preferred form of mechanism is shown and claimed in the above-mentioned Beatty patent.

The set of contacts 54 comprises a stationary contact 61 that is mounted at the inner end of a conductive stud 62. The other set of contacts 56 comprises a stationary contact 63 that is mounted at the inner end of a conductive stud 64. The two conductive studs 62 and 64 are respectively supported on the tank 50 by insulating bushings 65, which electrically insulate the studs from the tank when the contacts are open. The connection between the two sets of contacts is electrically connected to the tank by a conductor 67.

The capacitor assembly 9 of FIG. 1 is schematically illustrated in FIG. 3 connected between the conductive stud 62 and the tank 50 so that it is in parallel with the break 54. An identical capacitor assembly designated 9a is electrically connected between the other conductive stud 64 and the tank 50, so that it is in parallel with the other break 56. One of the purposes of these capacitor assemblies in the circuit breaker of FIG. 3 is to divide the voltage that is applied between the terminals 58 and 60 substantially equally between the two series-connected breaks 54 and 56.

When the circuit breaker of FIG. 3 is operated to open position, a blast valve (not shown) is opened to create a blast of air for aiding in the circuit interrupting operation. This opening of the blast valve during interruption results in a sudden drop in pressure inside the tank 50. It is important that this pressure drop not create pressure differentials in the capacitor assembly 9 that could, even temporarily, move the elements of the capacitor assembly out of engagement in opposition to the spring pressure exerted thereon. To prevent such pressure differentials from developing, we provide the tube 24 with a large number of openings which afford free communication between the space inside the tube and the space in tank 50 that is outside the tube. Preferably, these openings are provided by making the tube 24 of a loose weave fiber glass construction that has relatively large openings between the strands that make up the tube. This tube construction is depicted in FIG. 1, where the openings are designated 70. A suitable rigid plastic coats the fibers to impart rigidity to the tube but does not fill the above described openings in the tube. With these openings present, a pressure change outside the tube 24 results in a corresponding change throughout the entire interior of the tube. Thus, no pressure differentials are developed inside the tube that could move the elements of the capacitor assembly out of engagement.

Assume now that the circuit through the circuit breaker of FIG. 3 is energized an that the movable contacts 59 are driven into closed position. When the contacts reach the closed position, a short circuit path is established through the contacts across the terminals of each capacitor assembly 9 or 9a, and the capacitor assembly is free to quickly discharge through this short circuit path. The short circuit path that is present across the capacitor assembly 9 extends through the tank 50, conductor 67 and contacts 54.

It has been found that this sudden discharge subjects the ceramic capacitor elements 10 to high mechanical stresses which sometimes even crack the ceramic. These mechanical stresses are believed to be due to an electrostrictive effect, the severity of which varies directly with the peak voltage appearing across the capacitor assembly when the circuit oscillates following initial capacitor discharge. In one embodiment of our invention, we limit this peak voltage by providing enough resistance in circuit with the capacitor assembly to over-damp the capacitor discharge circuit, thus preventing any substantial overshoot of the voltage when the capacitor initially discharges. We provide this resistance by making the buttons 18 of a material that has enough resistance to impart the desired overdamping. This overdamping enables us to limit the peak voltage across the capacitor assembly to a value of one half or less that which would otherwise be developed, thus substantially reducing the electrostrictive effect on the ceramic elements.

Although the maximum amount of resistance present in the capacitor assembly is not highly critical, this maximum should be sufficiently low as to preclude overheating of the capacitor assembly by currents flowing therethrough when the contacts 54, 56 of the circuit breaker are opened.

The insulating coating 40 on each ceramic element serves an additional function not mentioned hereinabove. This function is that of acting as an energy damper that reduces the tendency of the ceramic element to crack in response to the electrostriction of the ceramic that results from sudden capacitor discharge.

In certain circuit breakers, there will be a resistor that is connected across each break just prior to the instant at which the break is closed. This resistor is a further help in reducing the amplitude of the voltage peak that will appear across the capacitor assembly when the break is closed.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. In an electric circuit breaker comprising a pair of separable contacts,
    (a) a capacitor assembly having a centrally-located longitudinal axis and comprising:
        (i) a plurality of ceramic elements, each having a pair of opposed faces disposed transversely of said longitudinal axis and an outer periphery extending between said faces,
        (ii) a conductive coating bonded to each face of the ceramic elements and having an outer periphery disposed at the outer periphery of the associated ceramic element,
        (iii) the conductive coatings on opposed faces of each ceramic element being electrically insulated from each other by said ceramic element,
        (iv) means for mounting said ceramic elements in end-to-end relationship along said longitudinal axis,
        (v) a plurality of conductive buttons respectively mounted between adjacent pairs of said ceramic elements but unattached to said ceramic elements,
        (vi) each of said buttons having opposed surfaces that engage the conductive coatings on adjacent faces of adjacent ceramic elements,
        (vii) said ceramic elements and the conductive coatings thereon extending transversely of said longitudinal axis to a greater extent than said buttons so that a portion of said conductive coating is located transversely beyond the periphery of the adjacent button all around the button periphery,
        (viii) a coating of insulating material on each face of said ceramic elements covering the outer periphery of said conductive coating and bonded to said conductive coating, said coating of insulating material covering the surface of said conductive coating from the outermost periphery to a location spaced radially inwardly from said outermost periphery,
        (ix) said coating of insulating material having an inner periphery extending about the adjacent button and forming a shoulder adapted to limit transverse shifting of said button, said button and said insulating coating being unattached to each other,
        (x) and spring means at one end of said assembly for exerting a force along said longitudinal axis that maintains said buttons in contact with the conductive coatings on adjacent ceramic elements,
    (b) means for connecting said capacitor assembly in parallel with said contacts,
    (c) said conductive buttons having sufficient resistance to overdamp the circuit comprising said capacitor assembly and said contacts when said contacts are closed while said circuit is energized.

2. An electric circuit breaker comprising:
    (a) a plurality of pairs of separable contacts adapted to be connected in series in a power circuit,
    (b) means for controlling the voltage distribution between said pairs of contacts when said circuit breaker is open comprising a plurality of capacitor assemblies respectively connected across said pairs of contacts,
    (c) each of said capacitor assemblies comprising a plurality of ceramic elements mounted in end-to-end relationship,
    (d) closing of each of said sets of contacts establishing a discharge circuit through said set of contacts for the capacitor assembly connected thereacross.
    (e) resistance means in each of said discharge circuits connected in series with said ceramic elements and said contacts,
    (f) said resistance means having a sufficiently high resistance to overdamp said discharge circuit when said contacts are closed while said power circuit is energized.

3. The electric circuit breaker of claim 2 in which each of said capacitor assemblies comprises conductive buttons of substantial resistance interposed between adjacent ceramic elements, said resistance means of claim 2 being constituted by said buttons.

References Cited

UNITED STATES PATENTS 2,572,598  10/1951  Curtis _____ 317—11
2,758,254  8/1956  Kramer _____ 317—11
3,325,708  6/1967  Mankoff et al. _____ 317—261

MILTON O. HIRSCHFIELD, *Primary Examiner.*

R. V. LUPO, *Assistant Examiner.*